US010244179B2

(12) United States Patent
Ebata

(10) Patent No.: US 10,244,179 B2
(45) Date of Patent: Mar. 26, 2019

(54) IMAGE PROCESSING APPARATUS, IMAGE CAPTURING APPARATUS, CONTROL METHOD, AND RECORDING MEDIUM

(71) Applicant: CANON KABUSHIKI KAISHA, Tokyo (JP)

(72) Inventor: Yuya Ebata, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 15/615,862

(22) Filed: Jun. 7, 2017

(65) Prior Publication Data
US 2017/0366720 A1 Dec. 21, 2017

(30) Foreign Application Priority Data

Jun. 20, 2016 (JP) .................. 2016-122050

(51) Int. Cl.
H04N 5/228 (2006.01)
H04N 5/235 (2006.01)
G06T 1/20 (2006.01)
G06T 1/60 (2006.01)
G06T 5/20 (2006.01)
H04N 5/378 (2011.01)
H04N 5/91 (2006.01)

(52) U.S. Cl.
CPC ............... *H04N 5/235* (2013.01); *G06T 1/20* (2013.01); *G06T 1/60* (2013.01); *G06T 5/20* (2013.01); *H04N 5/378* (2013.01); *H04N 5/91* (2013.01)

(58) Field of Classification Search
CPC ........... G06T 5/006; G06T 2207/20021; G06T 3/0018; H04N 3/23; H04N 5/208; H04N 5/3572
See application file for complete search history.

(56) References Cited

U.S. PATENT DOCUMENTS

2013/0236118 A1* 9/2013 Takahashi ............... G06T 5/001
382/275
2015/0163370 A1* 6/2015 Suzuki ................. H04N 1/2129
348/231.99

FOREIGN PATENT DOCUMENTS

JP 2007-074371 A 3/2007
JP 2008-117135 A 5/2008

* cited by examiner

Primary Examiner — Daniel M Pasiewicz
Assistant Examiner — Selam T Gebriel
(74) Attorney, Agent, or Firm — Venable LLP

(57) ABSTRACT

An image processing apparatus performs first image processing of processing a target image as a processing target and writing a first image as a processing result in a storage, and second image processing of reading out the first image written in the storage, processing the first image, and outputting a second image as a processing result. The first image processing and the second image processing are performed for each of a plurality of regions. Readout of the first image in the second image processing is performed in parallel with writing of the first image in the first image processing. A size of a second region defined for the first image as a processing target of the second image processing is set to be smaller than a size of a first region defined for a processing target image of the first image processing.

15 Claims, 14 Drawing Sheets

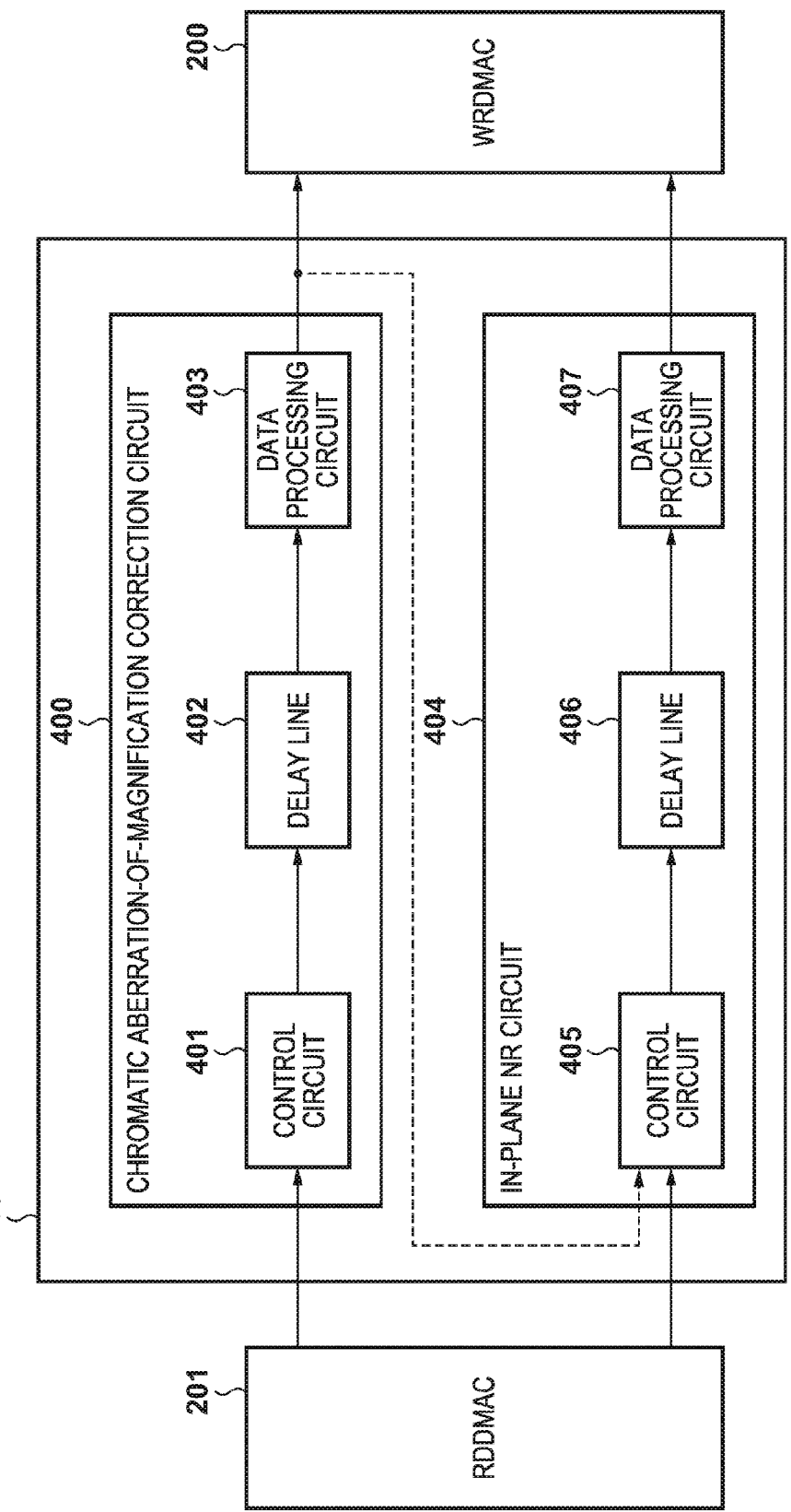

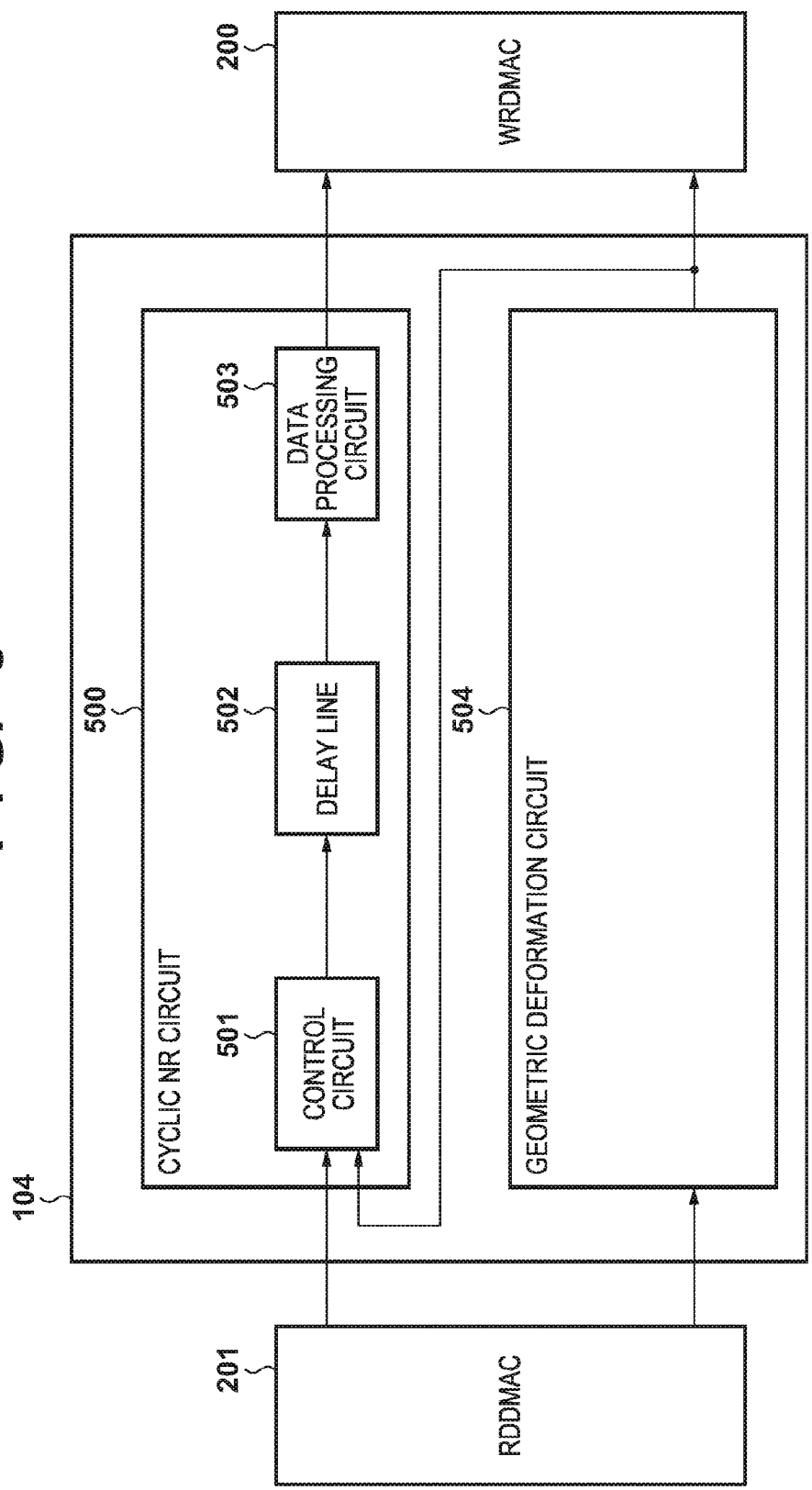

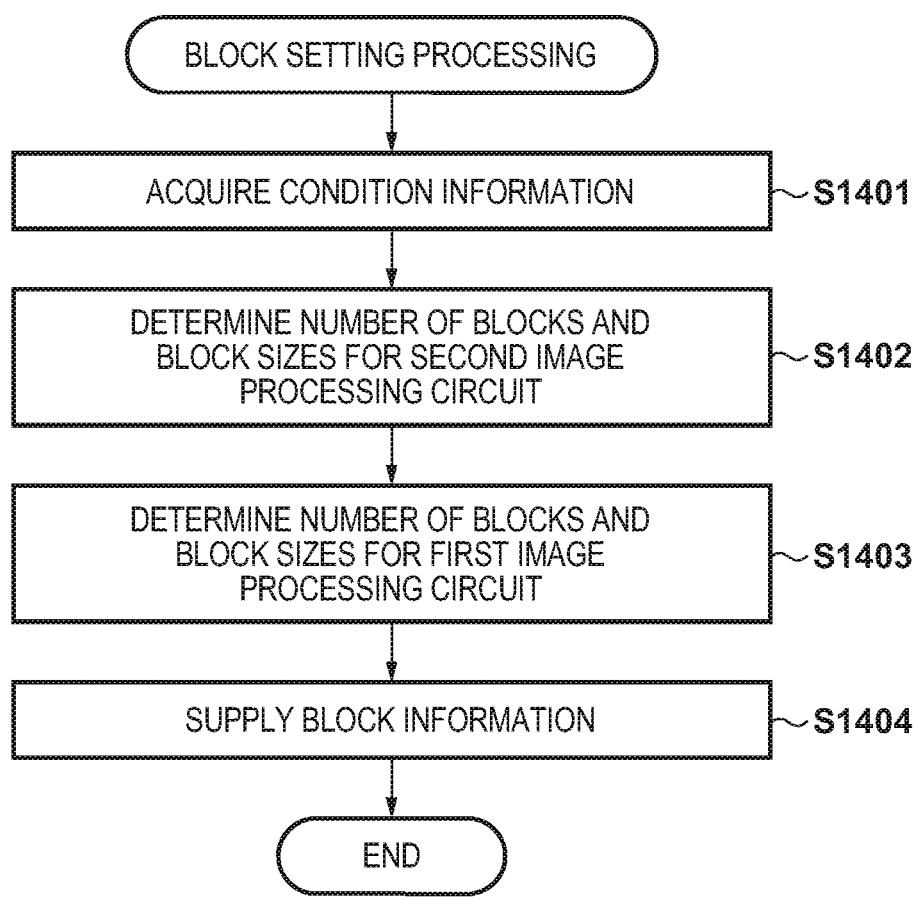

IMAGE PROCESSING APPARATUS, IMAGE CAPTURING APPARATUS, CONTROL METHOD, AND RECORDING MEDIUM

CLAIM TO PRIORITY

This application claims the benefit of Japanese Patent Application No. 2016-122050, filed Jun. 20, 2016, which is hereby incorporated by reference herein in its entirety.

BACKGROUND OF THE INVENTION

Field of the Invention

The present invention relates to an image processing apparatus, an image capturing apparatus, a control method, and a recording medium, and, particularly, to a technique of controlling image processing including a step of writing data in a memory and a step of reading out data from the memory.

Description of the Related Art

In recent years, as the number of pixels of an image sensor used in a digital camera, or the like, increases, the number of pixels of a generally distributed image also increases, and, thus, a data amount tends to increase. If image processing is performed for such an image, a method of reducing the total processing time by dividing the image into blocks may be used. Japanese Patent Laid-Open No. 2007-74371 discloses a technique of controlling, when performing image processing including a plurality of steps (shooting, compression, transfer, decompression, display, and the like) for each divided block, to provide a time difference between the processes of the respective blocks so none of the steps is performed for a plurality of blocks at the same time.

Furthermore, if, for example, a series of image processes are implemented by a plurality of image processing circuits or intermediate data is used for another processing, an operation of writing data in a memory and an operation of reading out the data from the memory may be included in a process of performing the series of image processes. In this case, if data is read out after waiting for completion of writing of the data in the memory, and then subsequent image processing is performed, the time taken to perform the processing increases by the waiting time. To solve this problem, Japanese Patent Laid-Open No. 2008-117135 discloses a technique of controlling operation to prevent a write address, at which data is currently written, from being passed by a readout address by allowing data write in a memory and data readout from the memory to be performed in parallel.

However, in the techniques described in Japanese Patent Laid-Open Nos. 2007-74371 and 2008-117135, the series of image processes are performed for each block divided before the start, and, thus, the processing time cannot be preferably reduced in some cases. For example, if, for one block, processing of referring to the peripheral pixels of the block is included as a step, it is necessary to make processing for the one block wait until processing of another block having the peripheral pixels is completed and at least the pixels are written in a memory.

SUMMARY OF THE INVENTION

The present invention was made in view of such problems in the conventional technique. The present invention provides an image processing apparatus for reducing the processing time taken to perform a series of image processes including division of an image, an image capturing apparatus, a control method, and a recording medium.

The present invention in its first aspect provides an image processing apparatus comprising a first processing circuit that performs first image processing for a target image as an input processing target, and writing a first image as a processing result in a storage device, a second processing circuit that reads out the first image written in the storage device, performs second image processing different from the first image processing for the first image, and outputs a second image as a processing result, and a control circuit that controls the first processing circuit and the second processing circuit, wherein the first image processing and the second image processing are performed for each of a plurality of regions defined for an image as a processing target, readout of the first image by the second processing circuit is performed in parallel with writing of the first image by the first processing circuit, and the control circuit sets a size of a second region defined for the first image as a processing target of the second image processing to be smaller than a size of a first region defined for the target image as a processing target of the first image processing.

The present invention in its second aspect provides an image capturing apparatus comprising an image sensor that performs image capturing, and outputs a target image, a first processing circuit that performs first image processing for the target image output from the image sensor, and writing a first image as a processing result in a storage device, a second processing circuit that reads out the first image written in the storage device, performs second image processing different from the first image processing for the first image, and outputs a second image as a processing result, and a control circuit that controls the first processing circuit and the second processing circuit, wherein the first image processing and the second image processing are performed for each of a plurality of regions defined for an image as a processing target, readout of the first image by the second processing circuit is performed in parallel with writing of the first image by the first processing circuit, and the control circuit sets sizes of first regions and sizes of second regions based on a state of the image capturing apparatus when the image sensor captures the target image, and sets the size of the second region defined for the first image as a processing target of the second image processing to be smaller than the size of the first region defined for the target image as a processing target of the first image processing.

The present invention in its third aspect provides a control method for controlling an image processing apparatus, the method comprising performing first processing of performing first image processing for a target image as an input processing target, and writing a first image as a processing result in a storage device, performing second processing of reading out the first image written in the storage device, performing second image processing different from the first image processing for the first image, and outputting a second image as a processing result, and controlling performance of the first processing and the second processing, wherein the first image processing and the second image processing are performed for each of a plurality of regions defined for an image as a processing target, readout of the first image in the second processing is performed in parallel with writing of the first image in the first processing, and performance of the first processing and the second processing is controlled so that a size of a second region defined for the first image as a processing target of the second image processing is smaller than a size of a first region defined for the target image as a processing target of the first image processing.

The present invention in its fourth aspect provides a non-transitory computer-readable recording medium recording a program for causing a computer to perform a control method for controlling an image processing apparatus, the method comprising performing first processing of performing first image processing for a target image as an input processing target, and writing a first image as a processing result in a storage device, performing second processing of reading out the first image written in the storage device, performing second image processing different from the first image processing for the first image, and outputting a second image as a processing result, and controlling performance of the first processing and the second processing, wherein the first image processing and the second image processing are performed for each of a plurality of regions defined for an image as a processing target, readout of the first image in the second processing is performed in parallel with writing of the first image in the first processing, and performance of the first processing and the second processing is controlled so that a size of a second region defined for the first image as a processing target of the second image processing is smaller than a size of a first region defined for the target image as a processing target of the first image processing.

Further features of the present invention will become apparent from the following description of exemplary embodiments (with reference to the attached drawings).

BRIEF DESCRIPTION OF THE DRAWINGS

FIG. 4 is a block diagram showing an example of the internal arrangement of a first image processing circuit 103 according to the embodiment of the present invention.

FIG. 5 is a block diagram showing an example of the internal arrangement of a second image processing circuit 104 according to the embodiment of the present invention.

FIG. 14 is a flowchart exemplifying block setting processing performed by a digital camera 120 according to the embodiment of the present invention.

DESCRIPTION OF THE PREFERRED EMBODIMENTS

Embodiment

An exemplary embodiment of the present invention will be described in detail below with reference to the accompanying drawings. Note that the embodiment to be described below will explain an example in which the present invention is applied to a digital camera, as an example of an image processing apparatus, for applying, to an image obtained by performing image capturing, image processing including writing of intermediate data in a memory and readout of the intermediate data from the memory during processing. However, the present invention is applicable to an arbitrary apparatus capable of, in performing image processes of at least two stages, writing the first image as the processing result of the image processing of the preceding stage, and outputting the second image by reading out the first image from the memory and performing the image processing of the subsequent stage.

<<Arrangement of Digital Camera 120>>

Figure 1:
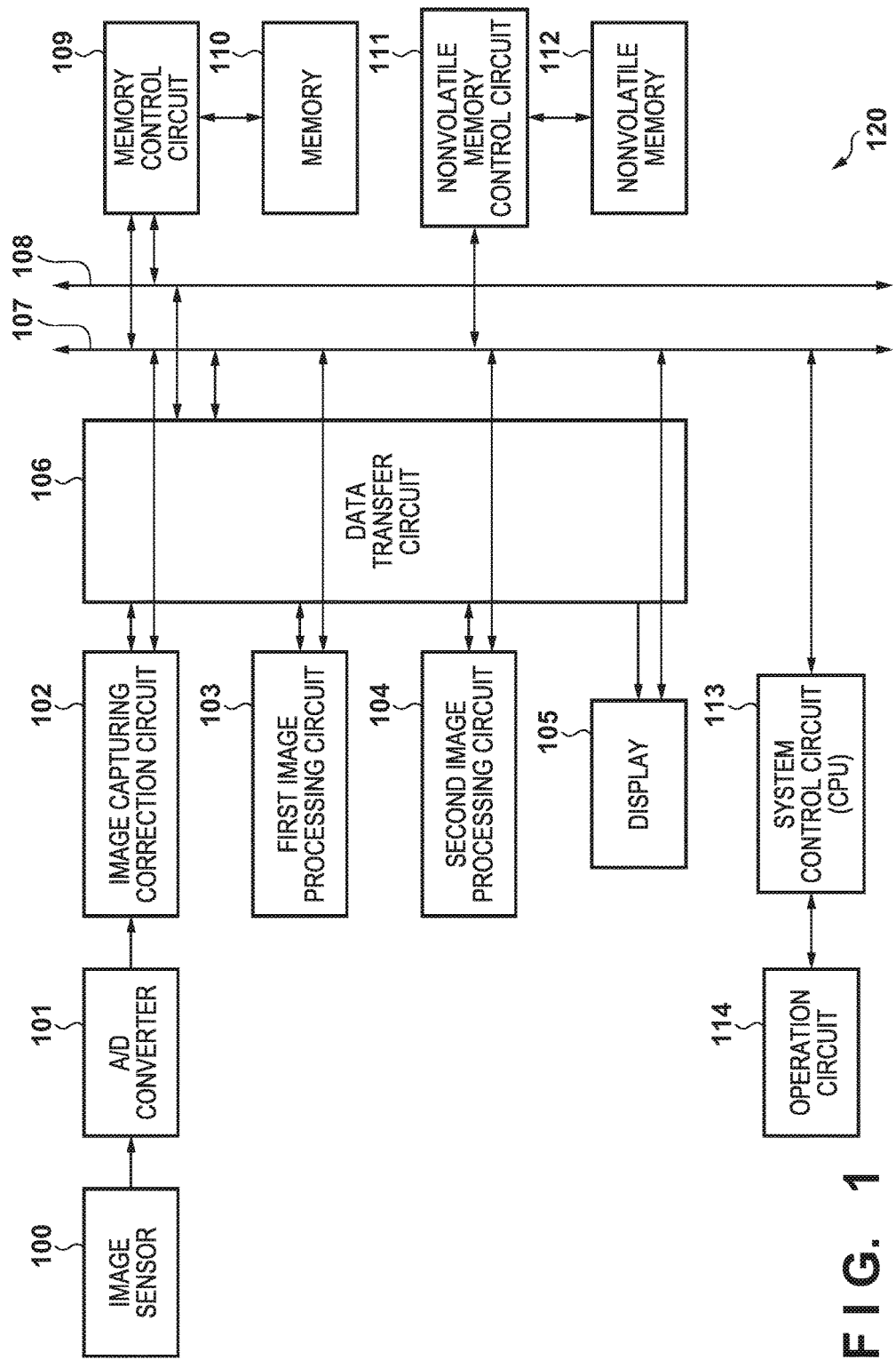
FIG. 1 is a block diagram exemplifying the functional arrangement of a digital camera 120 according to an embodiment of the present invention.

FIG. 1 is a block diagram showing the functional arrangement of the digital camera 120 according to the embodiment of the present invention.

An image sensor 100 is a photoelectric conversion element such as a CCD or a CMOS sensor. The image sensor 100 converts, into an electrical signal, an optical image of a subject that has received light via the image capturing optical system (including a lens) (not shown) of the digital camera 120, thereby outputting an analog image signal.

An A/D converter 101 performs A/D conversion processing for the analog image signal output from the image sensor 100 to convert the analog image signal into a digital image signal, thereby outputting the digital image signal.

An image capturing correction circuit 102 performs, for the digital image signal, output from the A/D converter 101, correction according to the image sensor or a signal level, such as pixel correction, black level correction, shading correction, or defective pixel correction. The digital image signal which has been applied with correction by the image capturing correction circuit 102, will be referred to as image data or simply as an image hereafter. This embodiment assumes that the image data is stored in a memory 110 via a data transfer circuit 106 (to be described later) and a memory control circuit 109. However, if a first image processing circuit 103 performs image processing without performing region division, the image data may be output to the first image processing circuit 103 without intervention of the memory 110.

<First Image Processing Circuit 103>

The first image processing circuit 103 serving as the first processing circuit of the present invention, performs image processing such as correction of a chromatic aberration of magnification, development processing, in-plane NR (Noise Reduction) processing, or enlargement/reduction (resizing) for an image (input image) read out from the memory 110 or a nonvolatile memory control circuit 111. For example, by controlling readout from the memory 110 by the memory control circuit 109, the image processing by the first image processing circuit 103 is sequentially performed for each region obtained by separating the input image into a plurality of regions (blocks). A description will be made assuming that, in the digital camera 120 according to this embodiment, the first image processing circuit 103 is responsible for the image processing of the preceding stage as the first image processing of the present invention among the series of image processes performed when displaying, on a display 105, the image obtained by performing image capturing. The first image processing circuit 103 may be configured as, for example, an image processing circuit for applying the image processing of the preceding stage to the input image, and sequentially outputs an image (first image) obtained as a processing result.

FIG. 4 shows a practical arrangement example of the first image processing circuit 103. For the sake of descriptive simplicity, in the example of FIG. 4, a description will be made assuming that the first image processing circuit 103 performs image processing associated with correction of a chromatic aberration of magnification and in-plane NR for each block of the first image as a processing target, which has been read out from the memory 110 via an RDDMAC 201 (to be described later).

Each of a chromatic aberration-of-magnification correction circuit 400 and an in-plane NR circuit 404 includes a control circuit 401 or 405 for controlling a readout request of a processing target block image based on information (block information) of the position and size of a block determined by a system control circuit 113 (to be described later). Each of the chromatic aberration-of-magnification correction circuit 400 and the in-plane NR circuit 404 includes a memory area, such as an SRAM, for holding, for filter processing, the block image input by a readout operation. More specifically, each of the chromatic aberration-of-magnification correction circuit 400 and the in-plane NR circuit 404 includes a delay line 402 or 406 for accumulating line data of block images, which are sequentially read out and input. Each of a data processing circuit 403 of the chromatic aberration-of-magnification correction circuit 400 and a data processing circuit 407 of the in-plane NR circuit 404 applies corresponding image processing (correction of a chromatic aberration of magnification or in-plane NR) to the processing target input image. At this time, in accordance with processing details, each data processing circuit reads out image data of a plurality of lines (in some cases, a single line) held in the corresponding delay line, thereby performing filter processing, or the like.

The block image of the processing result obtained by performing each processing is output to a controlled data bus 108 by sending a write request to a WRDMAC 200, and written in the memory 110 via the memory control circuit 109. Note that, in the example shown in FIG. 4, the processing result of each of the chromatic aberration-of-magnification correction circuit 400 and the in-plane NR circuit 404 is transmitted to the memory control circuit 109 by sending a write request to the WRDMAC 200, and written in the memory 110. However, as indicated by broken lines in FIG. 4, the first image as the processing result may be written so that the output of the chromatic aberration-of-magnification correction circuit 400 is input to the in-plane NR circuit 404, that is, after completion of the plurality of image processes in the first image processing circuit 103. In this case, since the memory access frequency in the overall processing by the first image processing circuit 103 is reduced, it is possible to reduce the occupancy of the bus band or the storage area of the memory 110.

<Second Image Processing Circuit 104>

The second image processing circuit 104 serving as the second processing circuit of the present invention performs image processing, such as geometric deformation, cyclic NR, or enlargement/reduction for the first image read out from the memory 110. Similarly to the first image processing circuit 103, for example, by controlling readout from the memory 110 by the memory control circuit 109, the image processing by the second image processing circuit 104 is sequentially performed for each region obtained by separating the first image into a plurality of regions. A description will be made assuming that, in the digital camera 120 according to this embodiment, the second image processing circuit 104 is responsible for the image processing of the subsequent stage as the second image processing of the present invention among the series of image processes performed when displaying, on the display 105, the captured image obtained by performing image capturing. The second image processing circuit 104 may be configured as, for example, an image processing circuit for applying the image processing of the subsequent stage to the input first image, and sequentially outputs an image (second image) obtained as a processing result.

FIG. 5 shows a practical arrangement example of the second image processing circuit 104. For the sake of descriptive simplicity, in the example of FIG. 5, a description will be made assuming that the second image processing circuit 104 performs image processing associated with geometric deformation and cyclic NR by setting, as a processing target, the first image that has been applied with the image processing by the first image processing circuit 103.

Details of a geometric deformation circuit 504 will be described first with reference to FIGS. 6 to 8. The geometric deformation circuit 504 performs, for example, processing of correcting a distortion of an optical image caused by the characteristic of the lens. If, for example, a distortion aberration in which an optical image is distorted toward the center of the image occurs, the optical image that is originally formed in a rectangular shape is deformed into a pincushion shape, as indicated by broken lines in an captured image (pre-correction image) 700 of FIG. 7. In this case, geometric deformation is performed so that an image within the pincushion range has the original rectangular shape in a post-correction image 701.

Figure 7:
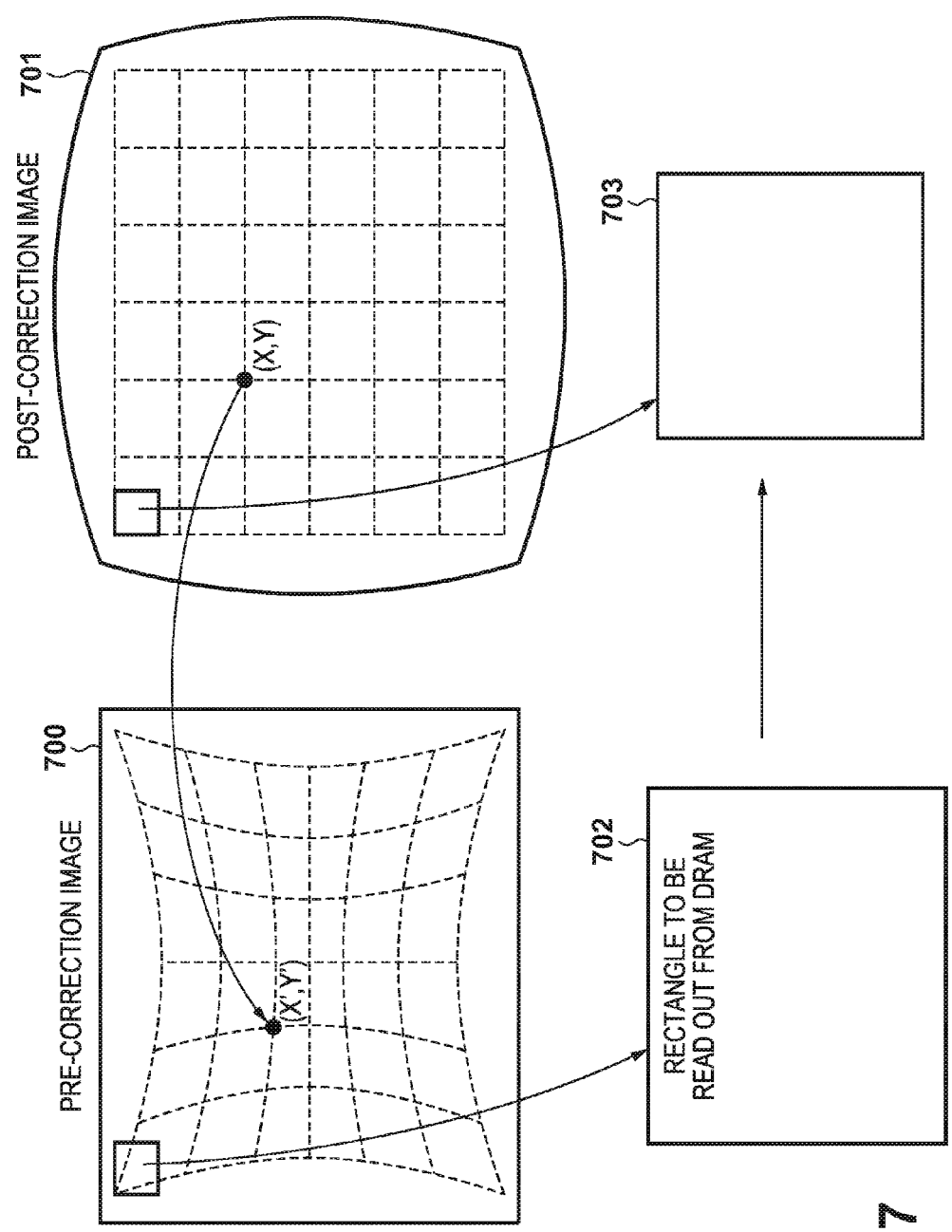
FIG. 7 is a view for explaining an example of image processing in which it is necessary to refer to peripheral pixels.
Figure 8:
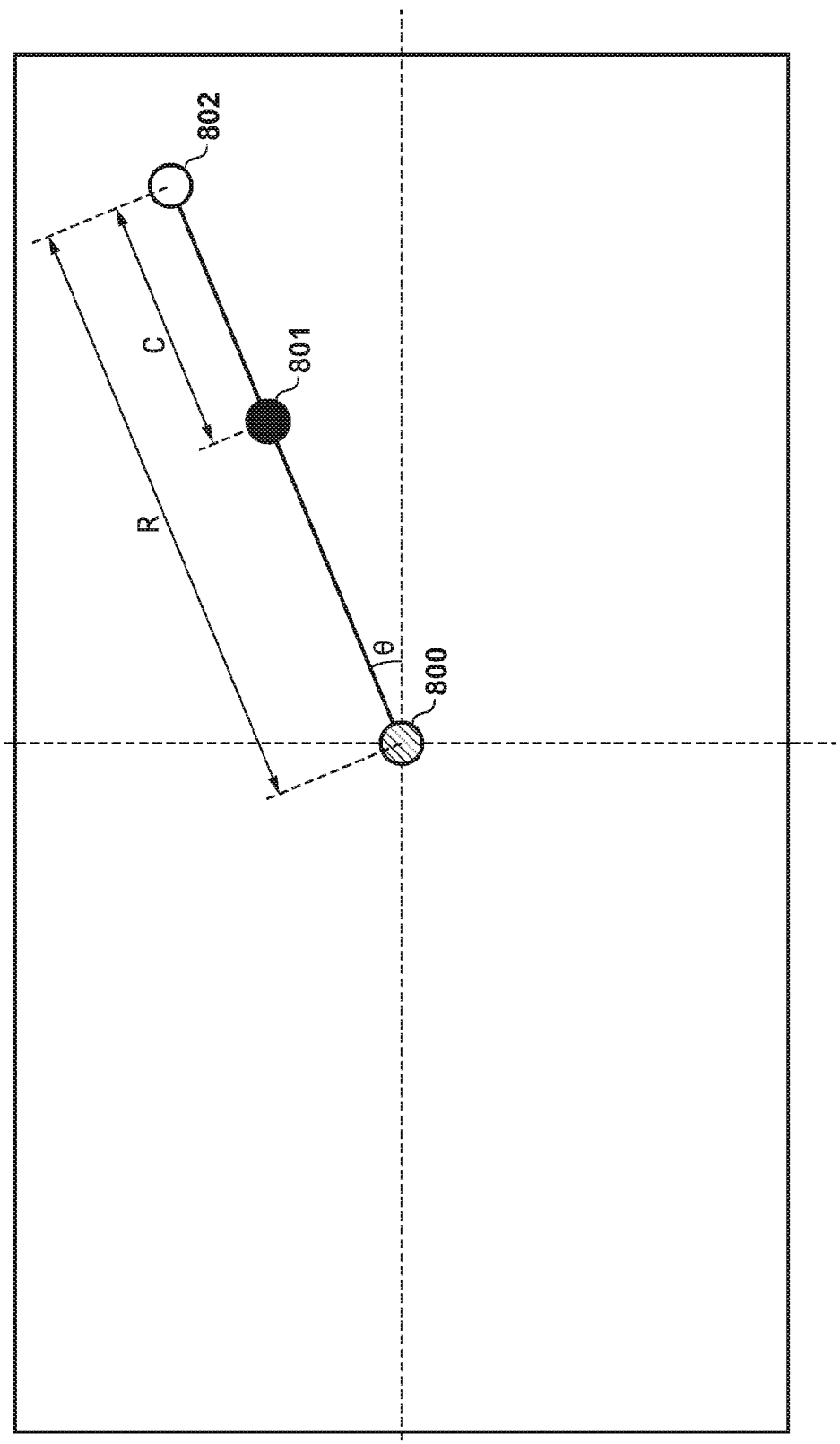
FIG. 8 is another view for explaining the example of the image processing in which it is necessary to refer to peripheral pixels.

More specifically, consider an example of defining an orthogonal coordinate system in which a direction along the scanning direction of the output pixels of the image sensor 100 is defined as a horizontal axis and a direction orthogonal to the scanning direction is defined as a vertical axis, as shown in FIG. 8. In this example, an optical image, which should be originally formed at a pixel 802, is formed at a pixel 801 on a straight line connecting the pixel 802 and a center 800 of the image due to a distortion aberration. In the example of FIG. 7, if a distortion aberration occurs in a direction toward the center (optical center) of the image, it is necessary to refer to information of a pixel at coordinates (x', y') in the pre-correction image 700 to generate a pixel at coordinates (x, y) in the post-correction image 701. Therefore, in the image processing of geometric deformation, to generate the pixel value of the pixel at the coordinates (x, y) in the post-correction image 701, it is necessary to derive the coordinates (x', y') in the pre-correction image 700 based on optical information indicating the characteristic of the lens, and to refer to a peripheral region including the pixel at the coordinates. That is, in geometric deformation processing for the coordinates (x, y) in the post-correction image 701, it is necessary to read out an image from an address corresponding to the coordinates (x', y') in the memory 110.

Note that the pre-correction coordinates (x', y') which are referred to for geometric deformation in generation of post-correction coordinates (x, y), are derived based on an image height R representing a distance from the center of the image to the post-correction coordinates, the characteristic of the lens, and the state (zoom magnification) of the lens at the time of shooting, as shown in FIG. 8. More specifically, a correction amount C representing the distance between the post-correction coordinates and the pre-correction coordinates is obtained from the image height R, the characteristic of the lens, and the like, and the pre-correction coordinates can be calculated based on a value obtained by subtracting the correction amount C from the image height R and an angle θ formed by the horizontal axis and a direction from the center 800 of the image to the pixel 801. At this time, since the obtained pre-correction coordinates are not always integer values, it is readily understood that the deriving result is not limited to a pixel circuit.

Figure 6:
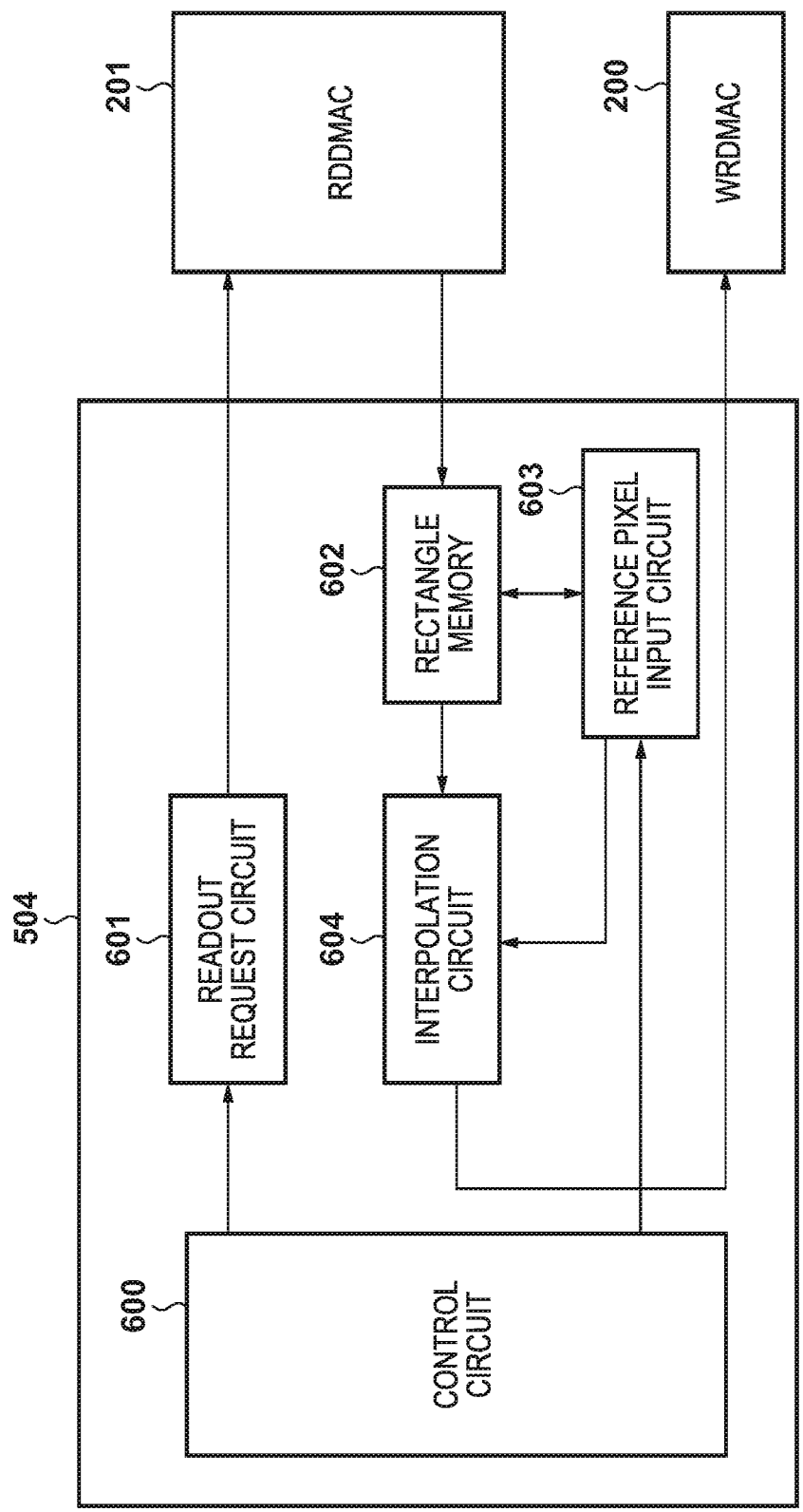
FIG. 6 is a block diagram showing an example of the internal arrangement of a geometric deformation circuit 504 according to the embodiment of the present invention.

As shown in FIG. 6, the geometric deformation circuit 504 of this embodiment may be, for example, a single image processing circuit, and is formed by a control circuit 600, a readout request circuit 601, a rectangle memory 602, a reference pixel input circuit 603, and an interpolation circuit 604. Based on the information of the position and size of the block determined by the system control circuit 113, the control circuit 600 controls readout of the first image of a region to be used for geometric deformation of the block and specifies a pixel to be used to generate each pixel of the block after geometric deformation. That is, the control circuit 600 performs the various calculation operations described with reference to FIGS. 7 and 8.

More specifically, the control circuit 600 specifies a region to be read out for the processing target block when processing the first image, which has been applied with the image processing by the first image processing circuit 103 and stored in the memory 110, by dividing the first image into blocks. If a distortion caused by the image capturing optical system is corrected, not only the region (corresponding region) corresponding to the processing target block of the first image, but also, the pixels of a region (reference region), which is obtained by calculation and includes pixels outside of the corresponding region can be read out for geometric deformation from the memory 110. In the example of FIG. 7, if a rectangular region 703 in the post-correction image 701 is set as a processing target block, a rectangular region 702, which includes a corresponding region existing at the same position in the pre-correction image 700 and is larger than the rectangular region 703 serves as a region to be read out. The control circuit 600 transmits, to the readout request circuit 601, the information of the regions (corresponding region and reference region) to be read out for the specified processing target block, and the readout request circuit 601 controls the readout request of the image (rectangle data) of the processing target block based on the information. The geometric deformation circuit 504 includes the rectangle memory 602, such as the SRAM, for storing the rectangle data, which has been read out from the memory 110 based on the readout request.

To generate each of the pixels of the region, corresponding to the processing target block, of the image after geometric deformation, the control circuit 600 specifies the pixels of the rectangle data to be used for interpolation for geometric deformation, and transmits the information to the reference pixel input circuit 603. Based on the information specified by the control circuit 600, for each of the pixels of the image after geometric deformation, the reference pixel input circuit 603 reads out the pixel to be used for interpolation from the rectangle memory 602, and inputs them to the interpolation circuit 604. The interpolation circuit 604 performs, for example, bicubic interpolation, or the like, based on the input pixels, thereby generating pixels after geometric deformation.

The second image processing circuit 104 includes a cyclic NR circuit 500 for performing noise reduction in the time direction when displaying data on the display 105, as shown in FIG. 5. Because of noise reduction in the time direction, the processing target of the cyclic NR circuit 500 is the image after geometric deformation, and processing is performed based on the image that has been applied with geometric deformation by the geometric deformation circuit 504 and an image displayed for a past frame. The cyclic NR circuit 500 includes a control circuit 501 for controlling, based on the information of the position and size of the block determined by the system control circuit 113, a readout request of an image of a region corresponding to the block of the image displayed for the past frame. Furthermore, the cyclic NR circuit 500 includes a delay line 502 for accumulating the line data of the image input by a readout operation and an image output from the geometric deformation circuit 504. A data processing circuit 503 reads out image data of a plurality of lines held in the delay line 502, and performs filter processing associated with cyclic NR, or the like.

The second image as a processing result obtained by performing the respective processes by the second image processing circuit 104 is output to the controlled data bus 108 by sending a write request to the WRDMAC 200, and written in the memory 110 via the memory control circuit 109. Note that, in the example shown in FIG. 5, the output of the geometric deformation circuit 504 is input to the control circuit 501. However, the processing result of the geometric deformation circuit 504 may be transmitted to the memory control circuit 109 by sending a write request to the WRDMAC 200, and written in the memory 110. In this case, in addition to the image displayed for the past frame, the control circuit 501 also issues a readout request of an image after the processing by the geometric deformation circuit 504.

As described above, in the digital camera 120 according to this embodiment, the first image processing circuit 103 and the second image processing circuit 104 perform the series of image processes when displaying, on the display 105, the captured image obtained by performing image capturing. To reduce the processing time taken to perform the series of image processes, the image is divided into blocks, and the image processing of the subsequent stage for the pixels of one block is preferably performed as soon as a necessary number of pixels applied with the image processing of the preceding stage, which are necessary for processing of the pixels, are stored in the memory 110. That is, the image processing of the preceding stage and that of the subsequent stage are performed in parallel for one captured image. More efficiently, as for one block related to the image processing of the subsequent stage, some pixels, which are referred to in the processing of the block, may be written in the memory 110 upon completion of the image processing of the preceding stage after start of the processing of the block, thereby enabling so-called address-pass processing.

The display 105 includes, for example, a display device, such as an LCD, and performs control associated with display output. In this embodiment, under the control of the system control circuit 113, the display 105 controls operation to display, on the display device, the second image that has been applied with the series of image processes and stored in the memory 110.

The data transfer circuit 106 controls writting of data in the memory 110 and readout of the data stored in the memory 110 in the digital camera 120. More specifically, the data transfer circuit 106 performs data transfer with the memory 110 via the data bus 108 for the image for which the image capturing correction circuit 102, the first image processing circuit 103, the second image processing circuit 104, or a compression/decompression circuit (not shown) for performing compression processing and decompression processing performs processing.

Figure 2:
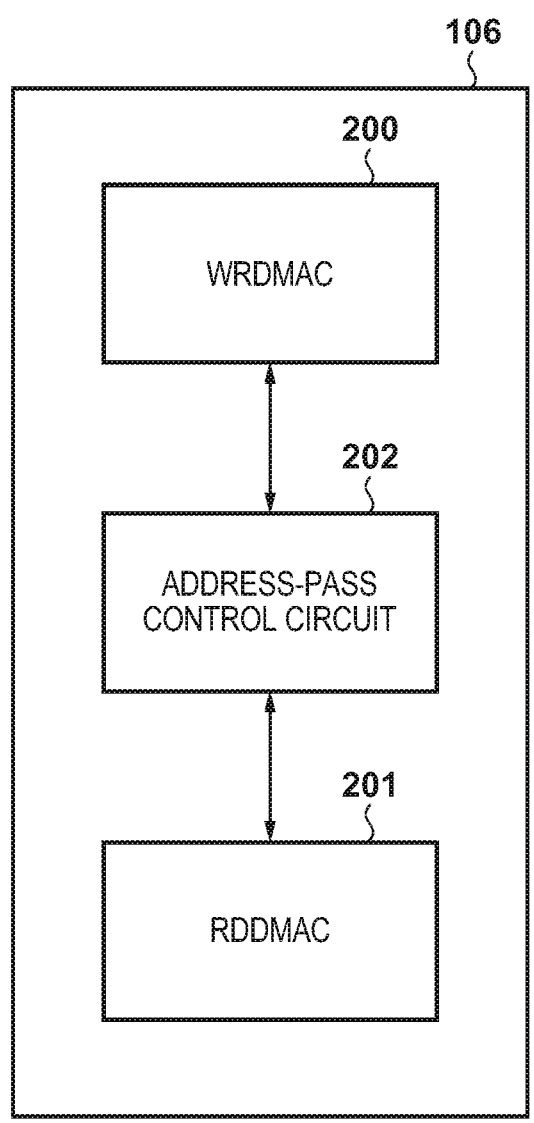
FIG. 2 is a block diagram showing an example of the internal arrangement of a data transfer circuit 106 according to the embodiment of the present invention.

FIG. 2 shows the detailed arrangement of the data transfer circuit 106. As shown in FIG. 2, the data transfer circuit 106 includes the WRDMAC 200 and the RDDMAC 201, each of which may include one or more direct memory access controllers. The WRDMAC 200 controls the band occupancy of the data bus 108 based on the write request received from each circuit, and implements data transfer from the request source to the memory control circuit 109 and writing at a designated address by the memory control circuit 109. The RDDMAC 201 controls the band occupancy of the data bus 108 based on the readout request received from each circuit, and implements readout of the data from the designated address in the memory 110 and data transfer to the request source of the data.

The data transfer circuit 106 includes an address-pass control circuit 202 for controlling, when the image processing by the first image processing circuit 103 and that by the second image processing circuit 104 are performed in parallel, to prevent readout of pixels to be referred to in the latter image processing from being performed before writing after performing the former image processing. An overview of an address-pass control operation by the address-pass control circuit 202 when a processing target image 301 is separated into four blocks and processing is performed for each block, as shown in FIG. 3A, will now be described.

Figure 3A:
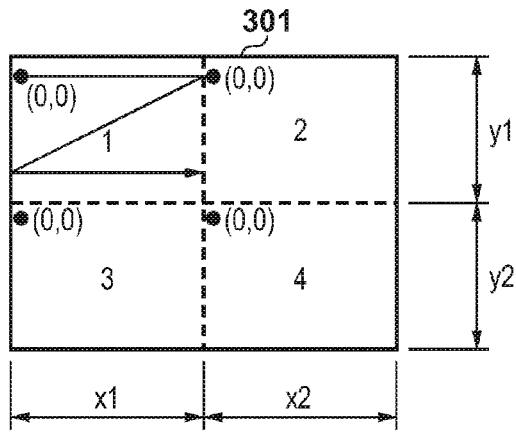
FIGS. 3A, 3B, and 3C are views for explaining address-pass control by the data transfer circuit 106.

For example, consider a case in which image processing is performed for blocks 1, 2, 3, and 4 shown in FIG. 3A in the order named. By setting the upper left point of each block as an origin (0, 0), the write/readout address of the image is controlled based a two-dimensional address (x, y) in the horizontal and vertical directions and (Xn, Yn) for identifying a processing target block. More specifically, the data transfer circuit 106 converts the information of each block into an absolute address in the memory 110 by predetermined calculation, and supplies it to the WRDMAC 200 or the RDDMAC 201. As shown in FIG. 3A, as the access order of each block, the upper left pixel of the block is first accessed and pixels on the same horizontal line are accessed rightward, and then, access is made from the leftmost pixel on the next (lower) horizontal line in the same manner.

In the example of FIG. 3A, the number of pixels in the horizontal direction of block 1 or 3 is represented by x1, the number of pixels in the horizontal direction of block 2 or 4 is represented by x2, the number of pixels in the vertical direction of block 1 or 2 is represented by y1, and the number of pixels in the vertical direction of block 3 or 4 is represented by y2. For the sake of descriptive simplicity, assume that x1=x2 is set, and the pixels of the target image are arranged at two-dimensional addresses in the memory 110 in a state in which blocks 1, 2, 3, and 4 are connected in the vertical direction in the order named, as shown in FIG. 3C.

Figure 3B:
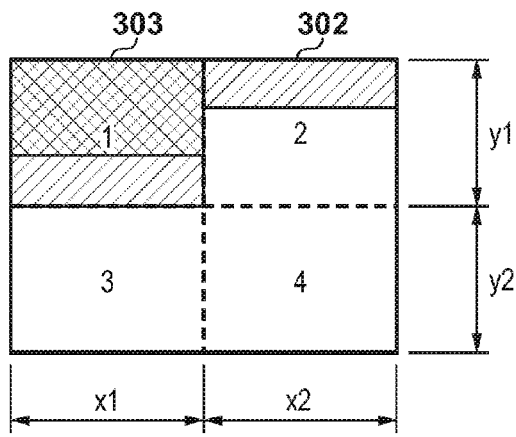
Figure 3C:
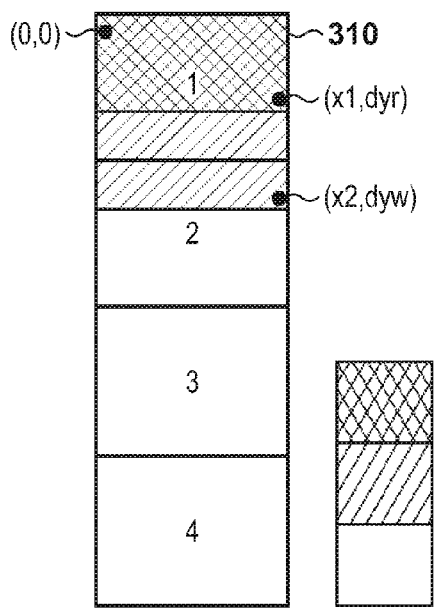

If address-pass control is performed, a data readout address follows a data write address, as exemplified in FIG. 3B. In FIGS. 3B and 3C, a hatched region 302 indicates pixels (region) for which the preceding processing has been performed and which have been written in the memory 110. A crosshatched region 303 indicates pixels (region) that have been read out from the memory 110 in the subsequent processing. The remaining non-hatched region indicates pixels (region) that have not been written after the preceding processing. At this time, every time, for example, an address to be accessed is changed, the WRDMAC 200 transmits, to the address-pass control circuit 202, information (Xnw, Ynw) for identifying a block that is currently written and the address of a pixel (xw, yw) that is currently written. Every time, for example, an address to be accessed is changed, the RDDMAC 201 transmits, to the address-pass control circuit 202, information (Xnr, Ynr) for identifying a block that is currently read out and the address of a pixel (xr, yr) that is currently read out.

As for the address to be accessed, the horizontal address indicates the horizontal position (xw or xr) of a pixel in the block, the readout and write vertical addresses are given by:

$$dyw = yw + ywoff$$

$$dyr = yr + yroff$$

That is, in the example of FIG. 3C, the readout address is represented by (x1, dyr), and write address is represented by (x2, dyw). Note that ywoff and yroff are 0 for the block 1, and offset values obtained by adding, every time the block is changed, the number of pixels in the vertical direction of the block before the change.

If address-pass control for each line is performed, the address-pass control circuit 202 calculates the difference between the write address and the readout address as a line count α, given by:

$$\alpha = dyw - dyr.$$

Readout of the RDDMAC 201 may be controlled in accordance with, for example, whether the line count α exceeds a threshold. More specifically, if α is smaller than the threshold, the address-pass control circuit 202 causes the RDDMAC 201 to temporarily stop the readout operation until α becomes not less than the threshold. Note that address-pass control need not be performed for each line, and may be performed for each pixel, as a matter of course. For example, if the difference between the horizontal addresses on the same line is not less than a threshold, a readout operation is enabled.

In response to an instruction from the system control circuit 113 or the data transfer circuit 106, the memory control circuit 109 writes data in the memory 110 or reads out the data from the memory 110. The memory 110 is, for example, a volatile memory such as a DRAM, and is a storage device having a capacity enough to store intermediate data, such as a predetermined number of still images, a moving image (a group of frames) for a predetermined time, or audio data.

In response to an instruction from the system control circuit 113, the nonvolatile memory control circuit 111 writes data in a nonvolatile memory 112 or reads out the data from the nonvolatile memory 112. The nonvolatile memory 112 is an electrically erasable/recordable storage device and, for example, an EEPROM, or the like, is used. The nonvolatile memory 112 stores operation programs for controlling the operations of the respective blocks of the digital camera 120, parameters necessary for the operations of the respective blocks, and the like.

The system control circuit 113 is, for example, a microcomputer or a CPU, and controls the operation of each block of the digital camera 120. More specifically, the system control circuit 113 reads out the operation program stored in the nonvolatile memory 112, loads it into the memory 110, and executes it, thereby controlling the operation of each block. The operation of each block is controlled via a system bus 107.

An operation circuit 114 serves as the user interface of the digital camera 120, such as a power button or shutter switch. The operation circuit 114 detects an operation input to each of various user interfaces, and transmits a corresponding control signal to the system control circuit 113.

This embodiment assumes that processing is implemented by a circuit or a processor corresponding to each block, which is included as hardware in the digital camera 120. The present invention, however, is not limited to this. The processing of each block may be implemented by a program for performing the same processing as that of each block.

<<Block Setting Processing>>

Block setting processing for determining block sizes and the number of blocks for each of the processes of the first image processing circuit 103 and the second image processing circuit 104 for the processing target captured image in the digital camera 120 according to this embodiment will be described in detail with reference to a flowchart shown in FIG. 14. The processing corresponding to the flowchart can be implemented when, for example, the system control circuit 113 reads out a corresponding processing program stored in the nonvolatile memory 112, loads it into the memory 110, and executes it. A description will be made assuming that in, for example, a shooting mode including moving image recording or through image display, the size determination processing starts at the start of the shooting mode, when the condition of an optical system such as zoom magnification is changed, or when the number of recording pixels, or the like, is changed.

In step S1401, the system control circuit 113 acquires condition information indicating the changed condition of the optical system. The condition information may be formed by including the settings of the optical characteristic and zoom magnification of the lens attached at the time of image capturing, and stored in the memory 110.

In step S1402, based on the acquired condition information, the system control circuit 113 determines block sizes and the number of blocks, each of which is set as the processing circuit of various image processes by the second image processing circuit 104. Especially, like the geometric deformation circuit 504, the determination processing in this step is performed in consideration of the number of pixels to be used in the image processing by including the number of peripheral pixels that exist outside of the target block and can change in accordance with the condition information. That is, as described above, like the geometric deformation circuit 504, for the processing of each block, the block and its peripheral pixels are referenced. Thus, in the image processing performed for one first image, it is necessary to process pixels, the number of which is not less than the total number of pixels of the image, during the image processing.

The image sensor 100 according to this embodiment displays, as a through image, an image obtained by applying the processes of the first image processing circuit 103 and the second image processing circuit 104. Therefore, in this embodiment, in consideration of a frame rate (the update interval of the display image) related to through image display, and the processing performance of the second image processing circuit 104, block sizes and the number of blocks in the second image processing circuit 104 are determined. A method of determining block sizes and the number of blocks in the second image processing circuit 104 will be exemplified with reference to a flowchart shown in FIG. 10.

In step S1000, based on the cyclic NR circuit 500 of the second image processing circuit 104, the system control circuit 113 determines whether the number of horizontal pixels (the number of target horizontal pixels) of the first image as a processing target is equal to an integer multiple of the largest number of horizontal pixels (the number of held horizontal pixels), which can be held in the delay line 502. If the system control circuit 113 determines that the number of target horizontal pixels is equal to an integer multiple of the number of held horizontal pixels, it advances the process to step S1001. If the system control circuit 113 determines that the number of target horizontal pixels is not equal to an integer multiple of the number of held horizontal pixels, that is, the number of target horizontal pixels is indivisible by the number of held horizontal pixels, it advances the process to step S1002.

In step S1001, the system control circuit 113 calculates a block division number HN in the horizontal direction of the first image in the second image processing circuit 104, given by:

$HN$=number of target horizontal pixels/number of held horizontal pixels,

On the other hand, in step S1002, the system control circuit 113 calculates the block division number (horizontal division number) HN in the horizontal direction, given by:

$HN$=Int(number of target horizontal pixels/number of held horizontal pixels)+1, where Int( ) represents a function of returning an integer value obtained by discarding a fractional portion.

In step S1003, using a block division number (vertical division number) VN in the vertical direction, which has not been determined yet, the system control circuit 113 defines a total number T of pixels including reference pixels processed for all of the blocks by the geometric deformation circuit 504. As described above, in part of the image processing performed by the second image processing circuit 104, for a block for which the processing is performed, it is necessary to consider, as calculation targets, reference pixels outside of the block in addition to the pixels of the block. Therefore, in this step, based on the first image as the processing target, in accordance with an input to the geometric deformation circuit 504, which includes redundant readout, the total number T is defined by:

$T$=(number of target horizontal pixels+(number of horizontal pixels of reference peripheral pixels of block×$HN$))×(number of target vertical pixels+(number of vertical pixels of reference peripheral pixels×$VN$))     (1)

The number of reference peripheral pixels of each block may be determined based on, for example, the condition information, such as a zoom magnification. In this embodiment, for the sake of simplicity, the reference peripheral pixels in the processing of the block by the geometric deformation circuit 504 are assumed to be constant, regardless of the position of the block. As described above, however, the peripheral pixels may change in accordance with the image height corresponding to the block. Note that the number of target vertical pixels indicates the number of pixels in the vertical direction of the first image, and VN represents the block division number in the vertical direction in the second image processing circuit 104. Assume that VN is a variable whose value has not been confirmed yet in this step.

In step S1004, using the processing performance of the overall second image processing circuit 104 (the number of pixels processable by the second image processing circuit 104 per second (circuit time)) and the total number T, the system control circuit 113 defines a time TS taken to process the first image in the second image processing circuit 104. That is, the time TS is given by:

$$TS=T/\text{processing performance} \qquad (2)$$

In step S1005, based on the frame rate related to the update frequency of the through image, the system control circuit 113 calculates a frame time MS during which a through image of one frame is displayed, given by:

$$MS=1/\text{frame rate}.$$

The frame time MS indicates a time from when display of a through image of one frame starts until display of a through image of the next frame starts.

In step S1006, the system control circuit 113 determines the vertical division number VN of an integer value based on equations (1) and (2) and MS so that the time TS taken to process the processing target image in the second image processing circuit 104 is shorter than the frame time MS (MS>TS). As described above, the processes in steps S1000 to S1006 can determine the number of blocks to be set in the first image as the processing target in the second image processing circuit 104.

In step S1007, the system control circuit 113 determines whether the first image can be equally divided in the horizontal direction into blocks of the horizontal division number HN determined in step S1001 or S1002. That is, since block division is performed on a pixel basis, the system control circuit 113 determines, in this step, whether the number of target horizontal pixels is equal to an integer multiple of the horizontal division number HN. If the system control circuit 113 determines that the first image can be equally divided in the horizontal direction by the horizontal division number HN, it advances the process to step S1008. Otherwise, it advances the process to step S1009.

In step S1008, the system control circuit 113 calculates a size H1 in the horizontal direction of each block, given by:

$$H1=\text{number of target horizontal pixels}/HN.$$

On the other hand, in step S1009, the system control circuit 113 calculates the size H1 in the horizontal direction of each block except for blocks of one column and a size H2 in the horizontal direction of each block of the remaining one column, given by:

$$H1=\text{Int}(\text{number of target horizontal pixels}/HN)$$

$$H2=\text{number of target horizontal pixels}-(H1 \times HN).$$

Note that a position, such as the left end position or right end position at which the column having the block size H2 exists, is defined in advance.

In step S1010, similarly, the system control circuit 113 determines whether the first image as a processing target can be equally divided in the vertical direction into blocks of the vertical division number VN determined in step S1006. If the system control circuit 113 determines that the first image can be equally divided in the vertical direction by the vertical division number VN, it advances the process to step S1011. Otherwise, it advances the process to step S1012.

In step S1011, the system control circuit 113 calculates a size V1 in the vertical direction of each block, given by:

$$V1=\text{number of target vertical pixels}/VN.$$

On the other hand, in step S1012, the system control circuit 113 calculates the size V1 in the vertical direction of each block except for blocks of one row and a size V2 in the vertical direction of each block of the remaining one row, given by:

$$V1=\text{Int}(\text{number of target vertical pixels}/VN)$$

$$V2=\text{number of target vertical pixels}-(V1 \times VN).$$

Note that a position, such as the upper end position or lower end position at which the row having the block size V2 exists, is defined in advance.

Figure 10:
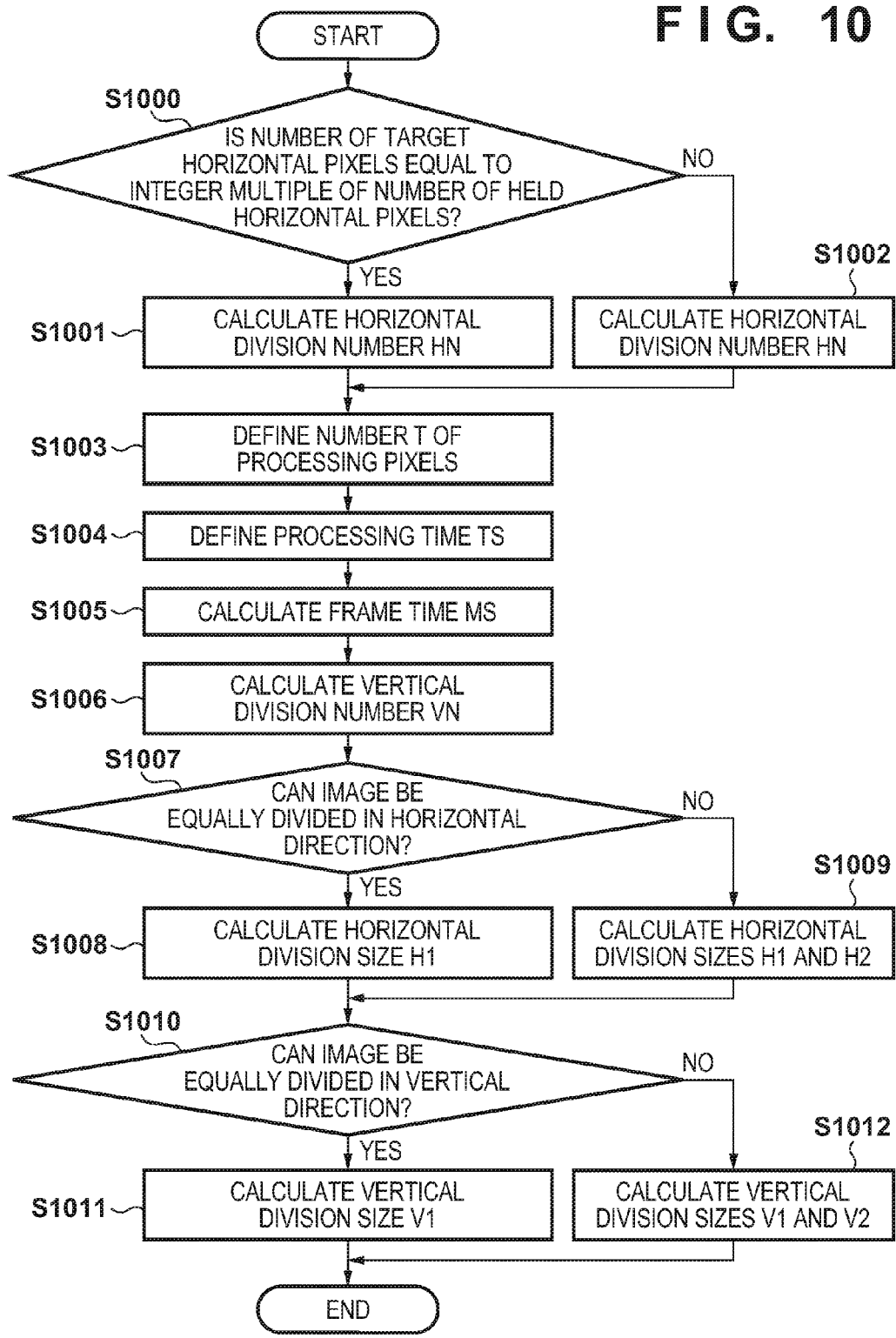
FIG. 10 is a flowchart exemplifying a method of determining block sizes and the number of blocks in the second image processing circuit 104 according to the embodiment of the present invention.

As described above, the system control circuit 113 can determine the block sizes (H1, H2, V1, and V2) and the number of blocks (HN×VN), each of which is set as the processing circuit of various image processes in the second image processing circuit 104. Note that the determination method described with reference to FIG. 10 is merely an example. It should be understood that the present invention is not limited to this.

After determining the block sizes and the number of blocks in the second image processing circuit 104, the system control circuit 113 determines, in step S1403, block sizes and the number of blocks, each of which is set as the processing circuit of various image processes by the first image processing circuit 103.

As described above, by performing the processing of the first image processing circuit 103 and the processing of the second image processing circuit 104 in parallel, the time taken to perform the series of image processes for the first image as a processing target is reduced. On the other hand, as in this embodiment, if, in processing of the image processing of the subsequent stage for one block, it is necessary to refer to peripheral pixels outside of the block, peripheral pixels that have been applied with the image processing of the preceding stage need to be stored in the memory 110 at least before a start of the processing of the block. That is, before completion of the image processing of the subsequent stage for one block, all peripheral pixels, which are referred to for the block, need to be stored in the memory 110. More specifically, in addition to this, at the start of the image processing of the subsequent stage for the block, the image processing of the preceding stage needs to be completed, for not only a predetermined number of pixels (for example, the pixels of a plurality of rows of the block) including a processing start pixel, but also, the pixels of a region, which is referred to for the pixel positions.

Figure 9:
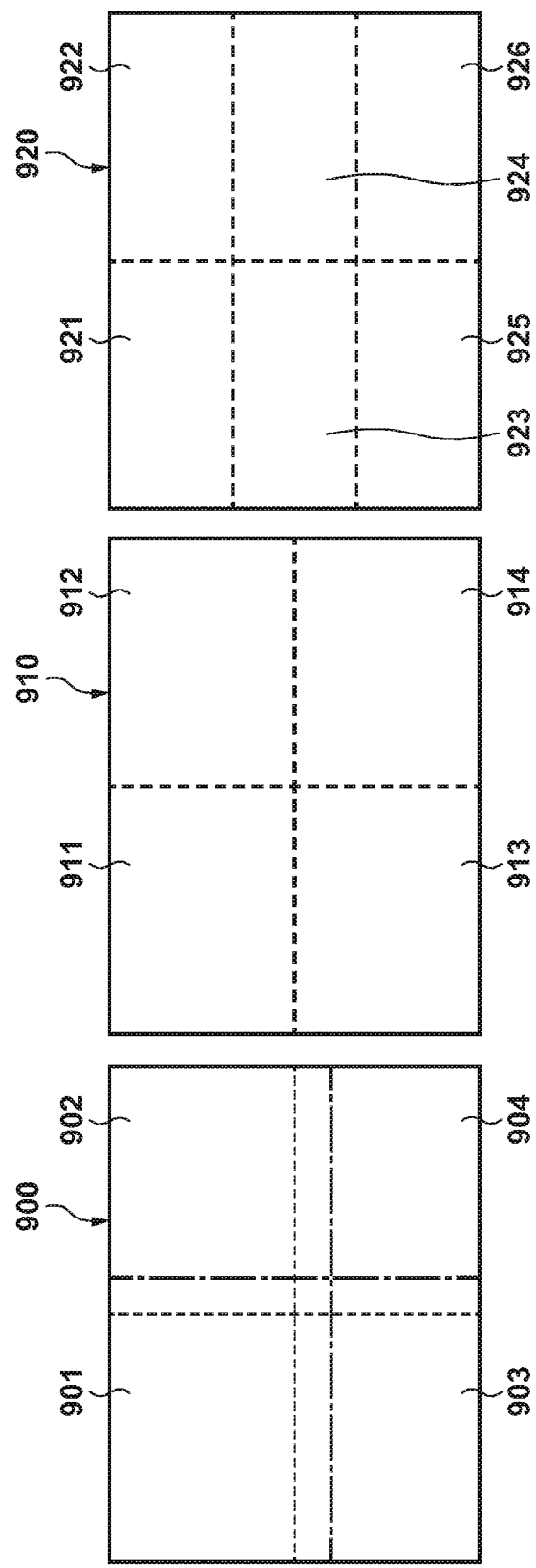
FIGS. 9A, 9B, and 9C are views respectively exemplifying block division states according to the embodiment and Modification 1 of the present invention.

Therefore, if, for example, blocks shown in FIG. 9B are set in a first image 910 after the image processing of the preceding stage, when the same blocks are also set in the image processing of the preceding stage, it is not able to start the image processing of the subsequent stage of a specific block or it is necessary to stop the image processing of the subsequent stage halfway. More specifically, if a peripheral region of n pixels in the horizontal direction and m pixels in the vertical direction is referred to in the image processing of the subsequent stage for a block 911 of the first image 910, the peripheral region is included in blocks 912, 913, and 914. That is, if the image processing of the subsequent stage is performed by sequentially changing the row from the upper left of the block 911, the second image processing circuit 104 cannot start the image processing of the subsequent stage for the block 911, unless at least corresponding pixels of the block 912 are stored in the memory 110 at the time of processing of the first row. To complete the image processing of the subsequent stage for all of the pixels of the block 911, the image processing of the preceding stage for the block 913 needs to be completed and the image processing of the preceding stage for some of the pixels (rows) of the block 914 also needs to be completed.

Thus, in the digital camera 120 according to this embodiment, to reduce the prolonged processing time of the image processing of the subsequent stage, the system control circuit 113 determines block sizes for the first image processing circuit 103 based on the block sizes determined for the second image processing circuit 104. In this embodiment, in the processes of the first image processing circuit 103 and the second image processing circuit 104, the numbers of blocks set in the horizontal and vertical directions of the processing target image are the same, and a processing order and the positional relationship between the blocks in the image are associated with each other. For this reason, when performing the processing of the corresponding block in the second image processing circuit 104, the system control circuit 113 determines block sizes for the first image processing circuit 103 so that all of the pixels of the peripheral region, which are referred to in the processing, are stored in the memory 110. As shown in, for example, FIG. 9B, when four blocks having equal sizes are set for the first image 910 as the processing target of the second image processing circuit 104, blocks having different sizes are set for the first image processing circuit 103, as indicated by one-dot dashed lines in FIG. 9A. In the example of FIG. 9A, a block 901 in an image (target image) 900 as the processing target of the first image processing circuit 103 is set to have a size including peripheral pixels, which are referred to in the processing of the corresponding block (the block 911 in the image 910), in the second image processing circuit 104. That is, for the block 901, which is first applied with the image processing by the first image processing circuit 103, the system control circuit 113 sets a size larger than that of the block 911 associated with the processing of the second image processing circuit 104 by n pixels in the horizontal direction and m pixels in the vertical direction. In the example of FIG. 9A, if the size of the block 901 is determined, the sizes of blocks 902, 903, and 904 are determined. The present invention, however, is not limited to this. The size of each block in the target image 900 may be determined to include pixels at pixel positions, which are referred to in the processing of the corresponding block in the first image 910.

If the number of blocks and block sizes for each of the processes of the first image processing circuit 103 and the second image processing circuit 104 are determined, the system control circuit 113 supplies, in step S1404, information determined to be block information to each image processing circuit. With this processing, it is possible to determine the size of a region as the processing circuit of each of the image processing of the preceding stage and the image processing of the subsequent stage, so that these processes are efficiently performed, in consideration of reference in the processing of the subsequent stage among the series of image processes.

Figure 11:
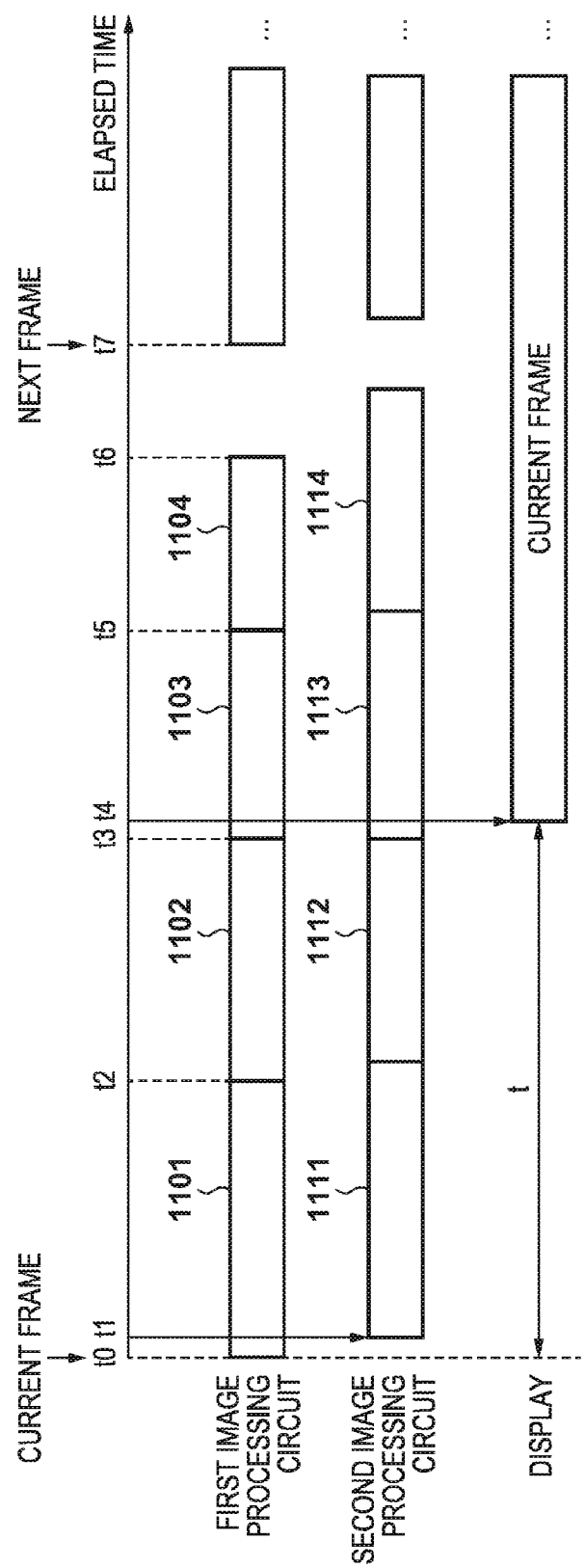
FIG. 11 is a timing chart exemplifying a series of image processes according to the embodiment of the present invention.

For example, if blocks are set for the first image processing circuit 103 and the second image processing circuit 104, as shown in FIGS. 9A and 9B, it is possible to provide a through image with less delay, as shown in the timing chart of FIG. 11. More specifically, the first image processing circuit 103 starts processing 1101 for the block 901 at t0, the second image processing circuit 104 performs no processing until, for example, pixels of j rows, which are referred to in processing for the first row of the block 911, are stored in the memory 110. If the pixels of the j rows are stored in the memory 110, the second image processing circuit 104 starts a readout request of the first image for the block 911 and the reference region at t1, thereby performing processing 1111 for the block 911. If generation of pixels included in a row in the horizontal direction from the upper end of the image is completed, display processing on the display 105 can start for the second image as, for example, a through image obtained when the second image processing circuit 104 performs the image processing of the subsequent stage for the first image 910. In the example of FIG. 11, display of the second image starts at t4 after the second image processing circuit 104 completes the processing 1111 and processing 1112 for the blocks 911 and 912 of the image 910. As described above, in the digital camera 120 according to this embodiment, it is possible to implement display of a through image of a captured image with delay of a time t (t4–t0) after completing various processes for the captured image and causing the first image processing circuit 103 to start processing for the input image. The delay time t need not be after completion of the processes for the blocks 911 and 912. For example, it may be defined that, when displaying the pixels of a row at the upper end of the region corresponding to the block 914 of the second image, part of the processing for the block by the second image processing circuit 104 is completed. After completion of the image processing of the preceding stage (until t6) for one frame, the first image processing circuit 103 can start the image processing of the preceding stage for the next frame at t7.

As described above, the image processing apparatus according to this embodiment can reduce the processing time taken to perform the series of image processes including division of an image. Note that this embodiment has described the method of determining the block sizes of the target image in the first image processing circuit 103 in consideration of the reference region used for processing of each block after setting the block sizes of the first image in the second image processing circuit 104. The present invention, however, is not limited to this. Especially, a method of increasing at least some block sizes in the image processing of the preceding stage based on the block sizes in the image processing of the subsequent stage may cause processing delay depending on the performance of the first image processing circuit 103 and the arrangement of the memory area. Therefore, the system control circuit 113 may be configured to set block sizes in the first image processing circuit 103 to those based on equal division or the like, and determine block sizes in the second image processing circuit 104 so as to reduce the stop or waiting time based on the condition information. Alternatively, the system control circuit 113 may set block shapes and sizes in the first image processing circuit 103 so that block division, in the second image processing circuit 104, is equal division, and determine smaller equal sizes as block sizes in the second image processing circuit 104. In either case, this makes it possible to set the size of each region of the processing circuit of the image processing of the subsequent stage to be smaller than the size of each region of the processing circuit of the image processing of the preceding stage. Consequently, it is possible to efficiently apply the series of image processes by setting a processing circuit so as to reduce the waiting time until data is stored or the time during which the processing is temporarily stopped or so as to eliminate the need to wait or to temporarily stop the processing.

[Modification 1]

In terms of shortening the time from when the processing of the first image processing circuit 103 starts until display on the display 105 starts, block division is preferably performed to preferentially store, in the memory 110, all pixels of a predetermined number of rows from the upper end row of the through image (second image). In the above-described embodiment, the method of determining the number of blocks in the vertical direction in the second image processing circuit 104 is determined so that the processing in step S1006 of FIG. 10 is performed within the frame time. If, however, the calculation performance is sufficient, a plurality of numbers of blocks can be selected. At this time, if the number of blocks in the vertical direction is increased to a value larger than that of the first image 910 shown in FIG. 9B, as indicated by an image 920 shown in FIG. 9C, display processing of the through image can start after completion of processes of blocks 921 and 922 by the second image processing circuit 104. That is, when performing the image processing of the preceding stage, the image processing of the subsequent stage, and the display processing in parallel, it is possible to reduce the delay time until the display processing as the block division number in the vertical direction increases.

On the other hand, if the block division number in the vertical direction increases, the number of pixels of the reference region which are read out redundantly with other blocks in the processing of each block by the second image processing circuit 104 increases in accordance with the number of blocks. That is, the band of the data bus 108 occupied by the readout operation by the data transfer circuit 106 in the processing of the second image processing circuit 104 increases. Therefore, the system control circuit 113 may control operation to approximately calculate the band occupancy of the data bus 108 within the time TS and make the band occupancy fall within a usable bandwidth when determining the number of blocks in the vertical direction.

[Modification 2]

Figure 12B:
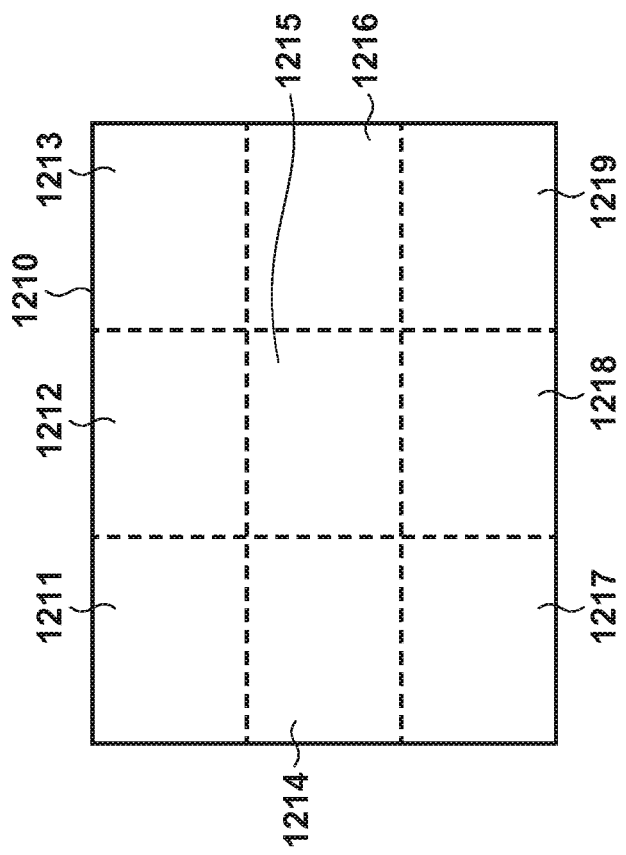
FIGS. 12A and 12B are views respectively exemplifying block division states according to Modification 2 of the present invention.
Figure 12A:
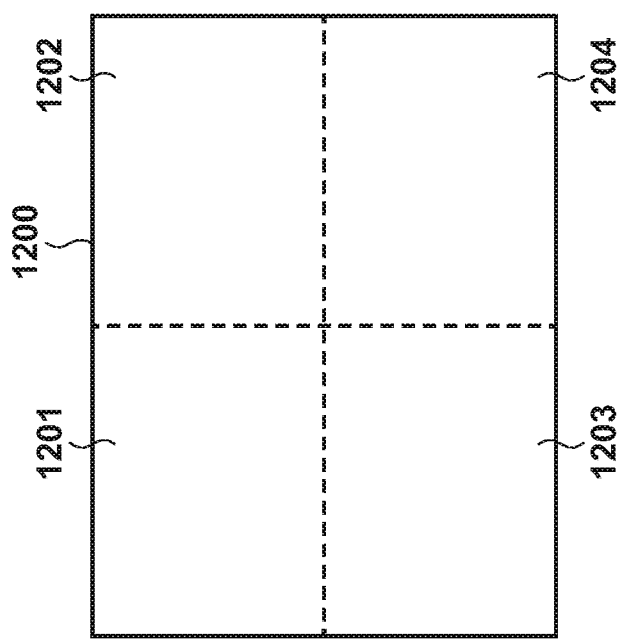

The above-described embodiment assumes that the block division number is constant in the image processing of the preceding stage and that of the subsequent stage. The present invention, however, is not limited to this. As shown in, for example, FIGS. 12A and 12B, blocks, the number of which is greater than that set for the processing of the first image processing circuit 103, may be set for the processing of the second image processing circuit 104. In other words, blocks are set based on equal division in the first image processing circuit 103 and the second image processing circuit 104, but the size of each block, which is set for the latter processing, may be smaller.

Figure 13:
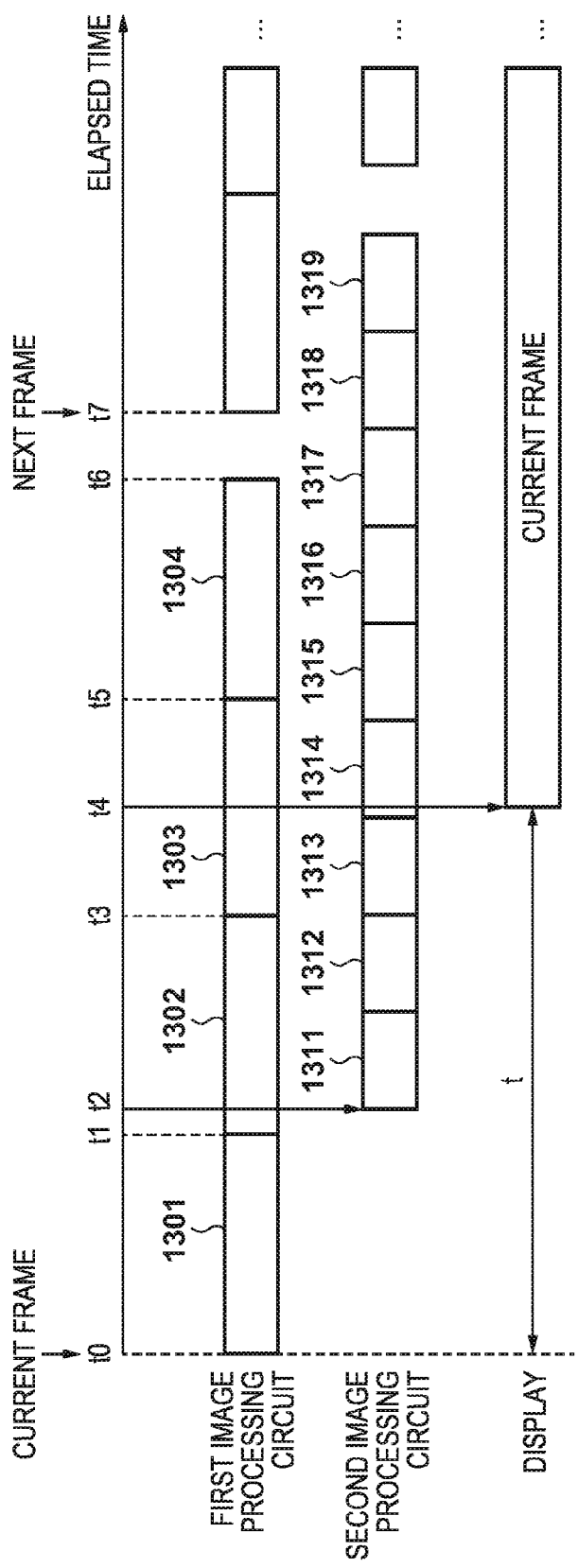
FIG. 13 is a timing chart exemplifying a series of image processes according to Modification 2 of the present invention.

Thus, at the time of processing of an arbitrary block by the second image processing circuit 104, pixels to be read out as a reference region for the block are stored in advance in the memory 110, and it is possible to shorten the time until display processing starts, as in Modification 1. As shown in, for example, FIG. 13, at t2, after a start of processes 1301 and 1302 of blocks 1201 and 1202 shown in FIG. 12A by the first image processing circuit 103, processing 1311 of a block 1211 shown in FIG. 12B by the second image processing circuit 104 starts. FIG. 13 shows a state in which address-pass control is implemented without stopping it. The present invention, however, is not limited to this. For example, t2 may be immediately after t0. However, processing 1316 of a block 1216 by the second image processing circuit 104 cannot be completed unless processing 1304 of a block 1204 by the first image processing circuit 103 advances for a predetermined number of rows. Therefore, the processing by the second image processing circuit 104 can be temporarily stopped along with address-pass control related to a readout operation.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing circuit (CPU), or a micro processing circuit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a first processing circuit which performs first image processing for a target image as an input processing target, and writing a first image as a processing result in a storage device;
   a second processing circuit which reads out the first image written in the storage device, performs second image processing different from the first image processing for the first image, and outputs a second image as a processing result; and
   a control circuit which controls the first processing circuit and the second processing circuit,
   wherein the first image processing and the second image processing are performed for each of a plurality of regions defined for an image as a processing target,
   readout of the first image by the second processing circuit is performed in parallel with writing of the first image by the first processing circuit, and
   the control circuit sets a size of a second region defined for the first image as a processing target of the second image processing to be smaller than a size of a first region defined for the target image as a processing target of the first image processing.

2. The apparatus according to claim 1, wherein the control circuit controls to prevent readout of pixels of the first image by the second processing circuit from being performed before writing of the pixels by the first processing circuit.

3. The apparatus according to claim 1, wherein the second image processing is image processing performed by reading out, for one second region defined for the first image, pixels of the region and pixels of a reference region outside of the region.

4. The apparatus according to claim 3, wherein the control circuit determines a size of at least one first region defined for the target image to include the pixels of the reference region read out in the second image processing, whose processing target is one second region.

5. The apparatus according to claim 3, wherein the control circuit determines the size of the first region so that the first region, including pixels corresponding to the second region, includes pixels read out as the reference region in the second image processing, whose processing target is the second region.

6. The apparatus according to claim 1, wherein the control circuit determines the sizes of the first regions and the sizes of the second regions so readout of pixels of the first image by the second processing circuit after performing at least the second image processing need not wait for writing of the pixels by the first processing circuit.

7. The apparatus according to claim 1, wherein the control circuit determines the sizes of the first regions and the sizes of the second regions based on processing performance of at least one of the first processing circuit and the second processing circuit and a usable bandwidth related to readout of the image from the storage device.

8. The apparatus according to claim 7, wherein the processing performance includes at least one of the number of pixels that can be read out and held in the corresponding image processing and the number of pixels that can be processed per circuit time in the corresponding image processing.

9. The apparatus according to claim 1, wherein the control circuit defines, for the target image, the first regions, the number of which is equal to the number of second regions defined for the first image, and which have a plurality of sizes.

10. The apparatus according to claim 1, wherein the control circuit controls the first processing circuit and the second processing circuit so that the number of second regions defined for the first image is greater than the number of first regions defined for the target image.

11. The apparatus according to claim 1, wherein the second image processing includes processing for performing geometric deformation.

12. An image capturing apparatus comprising:
an image sensor which performs image capturing, and outputs a target image;
a first processing circuit which performs first image processing for the target image output from the image sensor, and writing a first image as a processing result in a storage device;
a second processing circuit which reads out the first image written in the storage device, performs second image processing different from the first image processing for the first image, and outputs a second image as a processing result; and
a control circuit which controls the first processing circuit and the second processing circuit,
wherein the first image processing and the second image processing are performed for each of a plurality of regions defined for an image as a processing target,
readout of the first image by the second processing circuit is performed in parallel with writing of the first image by the first processing circuit, and
the control circuit sets sizes of first regions and sizes of second regions based on a state of the image capturing apparatus when the image sensor captures the target image, and sets the size of the second region defined for the first image as a processing target of the second image processing to be smaller than the size of the first region defined for the target image as a processing target of the first image processing.

13. The apparatus according to claim 12, wherein the state of the image capturing apparatus includes a characteristic of a lens used to capture the target image.

14. A control method for controlling an image processing apparatus, the method comprising:
performing first processing of performing image processing for a target image as an input processing target, and writing a first image as a processing result in a storage device;
performing second processing of reading out the first image written in the storage device, performing second image processing different from the first image processing for the first image, and outputting a second image as a processing result; and
controlling performance of the first processing and the second processing,
wherein the first image processing and the second image processing are performed for each of a plurality of regions defined for an image as a processing target,
readout of the first image in the second processing is performed in parallel with writing of the first image in the first processing, and
performance of the first processing and the second processing is controlled so that a size of a second region defined for the first image as a processing target of the second image processing is smaller than a size of a first region defined for the target image as a processing target of the first image processing.

15. A non-transitory computer-readable recording medium recording a program for causing a computer to perform a control method for controlling an image processing apparatus, the method comprising:
performing first processing of performing image processing for a target image as an input processing target, and writing a first image as a processing result in a storage device;
performing second processing of reading out the first image written in the storage device, performing second image processing different from the first image processing for the first image, and outputting a second image as a processing result; and
controlling performance of the first processing and the second processing,
wherein the first image processing and the second image processing are performed for each of a plurality of regions defined for an image as a processing target,
readout of the first image in the second processing is performed in parallel with writing of the first image in the first processing, and
performance of the first processing and the second processing is controlled so that a size of a second region defined for the first image as a processing target of the second image processing is smaller than a size of a first region defined for the target image as a processing target of the first image processing.

* * * * *